United States Patent [19]

Champseix et al.

[11] Patent Number: 4,766,933
[45] Date of Patent: Aug. 30, 1988

[54] TWO OR THREE WAY MICROELECTROVALVE WITH TWIN SEALING MEMBRANE

[75] Inventors: Henri Champseix, Montesson; Serge Champseix, Les Mureaux, both of France

[73] Assignee: Societe Anonyme Dite: ABX, Levallois, France

[21] Appl. No.: 64,060

[22] Filed: Jun. 19, 1987

[30] Foreign Application Priority Data

Jun. 20, 1986 [FR] France ............................ 86 08908

[51] Int. Cl.$^4$ ........................................... F16K 11/048
[52] U.S. Cl. ............................ 137/625.5; 137/625.27
[58] Field of Search ............ 137/625.5, 625.48, 625.27

[56] References Cited

U.S. PATENT DOCUMENTS

| | | | |
|---|---|---|---|
| 2,912,006 | 11/1959 | Cooksley | 137/625.5 X |
| 3,635,248 | 1/1972 | Klee | 137/625.5 |
| 4,161,190 | 7/1979 | Moller et al. | 137/596.18 |
| 4,181,154 | 1/1980 | Oley et al. | 137/863 |
| 4,237,931 | 12/1980 | Rafaely | 137/625.5 |

FOREIGN PATENT DOCUMENTS

| | | | |
|---|---|---|---|
| 2645448 | 12/1977 | Fed. Rep. of Germany . | |
| 2129602 | 10/1972 | France . | |
| 1004134 | 9/1965 | United Kingdom | 137/625.5 |
| 2059016 | 4/1981 | United Kingdom . | |

Primary Examiner—Arnold Rosenthal
Attorney, Agent, or Firm—Fleit, Jacobson, Cohn & Price

[57] ABSTRACT

A two or three way microelectrovalve with twin sealing membrane is provided in which the mobile assembly playing the role of closure member driven by the mobile core of an electromagnet is essentially formed of two flexible membranes mounted on each side of a core which passes through a central well in the main body of the microelectrovalve, whose two opposite faces are countersunk so as to form cups. The outgoing pipes which open into a zone of the cups set aside from the central well 6 are sealingly closed by each membrane by a small excentric part of the surface thereof.

8 Claims, 3 Drawing Sheets

TWO OR THREE WAY MICROELECTROVALVE WITH TWIN SEALING MEMBRANE

BACKGROUND OF THE INVENTION

The invention relates to a two or three way microelectrovalve intended for all fluids and particularly for aggressive or impurity laden liquids and relates more precisely to a microelectric valve with twin sealing membrane.

FIELD OF THE INVENTION

It is known that the purpose of manual or motor driven two or three way valves is to close the passage of the fluid in a pipe or to orient a fluid from one feed pipe to one or other of two distribution pipes. For that, the valve body to which these pipes are connected is usually provided with a mobile assembly which, depending on its position, opens or closes an orifice. In a three way valve the mobile assembly closes an orifice while opening another and conversely, and it is for example formed of a pivoting plate carrying a flexible sealing element, or else a closure flap with two faces moving in translation in a case between two opposite orifices. These assemblies, especially if they are driven by a motor or—as is the usual case in electrovalves by an electromagnet—must be carefully constructed so that the sealing is correctly provided, even after frequent use. That often involves complementary adjustment systems associated with return springs, arrangements which complicate the product and make it heavy. Although that is of no great importance for current use, when it is a question for example of directing water at normal pressure from a main pipe to a branch pipe, it is not at all the same in certain fields of use, such for example as in the medical field, where conventional electrovalves cannot be used. In this case of application, in fact, it is not possible to run the risk of the liquids concerned leaking from the electrovalve, or inversely being affected or polluted by an external medium whatever it is. On the other hand, the desired microvalves must often be of small size, light and able to be driven by a low power electromagnet.

DESCRIPTION OF THE PRIOR ART

To overcome these problems the solution is known which consists in using a semirigid closure member formed of one or more plastic material membranes which are applied against a conical piece playing the role of valve seat. So that sealing is correctly provided, the surfaces of the conical piece and of the membranes must be perfectly machined, which does not for all that exclude the risks of jamming or poor closure which frequently occur when the liquid used is laden with impurities.

In another known embodiment, such as that described in FR-A-No. 2 129 602, an electromechanically controlled spool is formed of two membranes on which rubber rings are applied, each of the membranes closing an annular channel into which emerges a fluid pipe passing through the body of the spool, a piston being inserted between the two membranes in a central wall. With this arrangement, sealing is provided by a central part of the membrane on an edge of the channel and consequently on a valve seat surface of relatively large area. For this reason, the fluid pressures in the spool must be limited. Another drawback of this type of valve resides in the fact that at the time of rinsing, because the inlet pipe emerges into the central wall, rinsing is only carried out on one side of the well, unless the spool is operated so as to rinse in both directions.

In order to overcome these drawbacks and to comply with sealing and miniaturization requirements, for certain particular applications, the applicant has designed a two or three way microelectrovalve, simple to construct and use, capable however of withstanding pressures which are relatively high with respect to its dimensions, and particularly adapted for transferring aggressive and/or impurity laden liquids, and which lends itself to rapid and efficient rinsing.

SUMMARY OF THE INVENTION

According to a main feature of the invention, a mobile assembly playing the role of closure member for fluid incoming and outgoing pipes in an inner chamber of the body, formed essentially of two flexible membranes mounted on each side of a body which passes through a central well provided in the main body of the microelectrovalve, is constructed so that each of the flexible membranes sealingly closes, by a small excentric part of its surface, the outgoing pipe which emerges into a zone of the corresponding cup set apart from the central well and so that the fluid incoming pipe opens into one of the cups in a zone also set apart from the central well.

At least one pipe opens into each cup inside a ring projecting from the cup and forming a seat for the closure member formed by each membrane.

Likewise, at least one pipe opens into a cup inside a recess formed in the bottom of this cup.

According to a particular feature of the invention, the core of the mobile assembly is formed of two identical parts each of which is formed of a cylinder ending in a plate with an indentation and formed with an axial through opening over the whole of its height and the two opposite faces of the main body of the valve are capped with end pieces having central apertures which are fixed to the main body and nip each of the membranes against the edges of the cups.

The different parts forming the mobile assembly namely an end plug, the membranes, the central core and an engagement means of the mobile core of the electromagnet are interlocked by means of a screw which passes through said mobile assembly.

BRIEF DESCRIPTION OF THE DRAWINGS

Other particular features and advantages of the invention will be clear from reading the following description of a non limitative example with reference to the accompanying drawings which show:

FIG. 4, a view along IV—IV of FIG. 2.

DESCRIPTION OF THE PREFERRED EMBODIMENT

Figure 1:
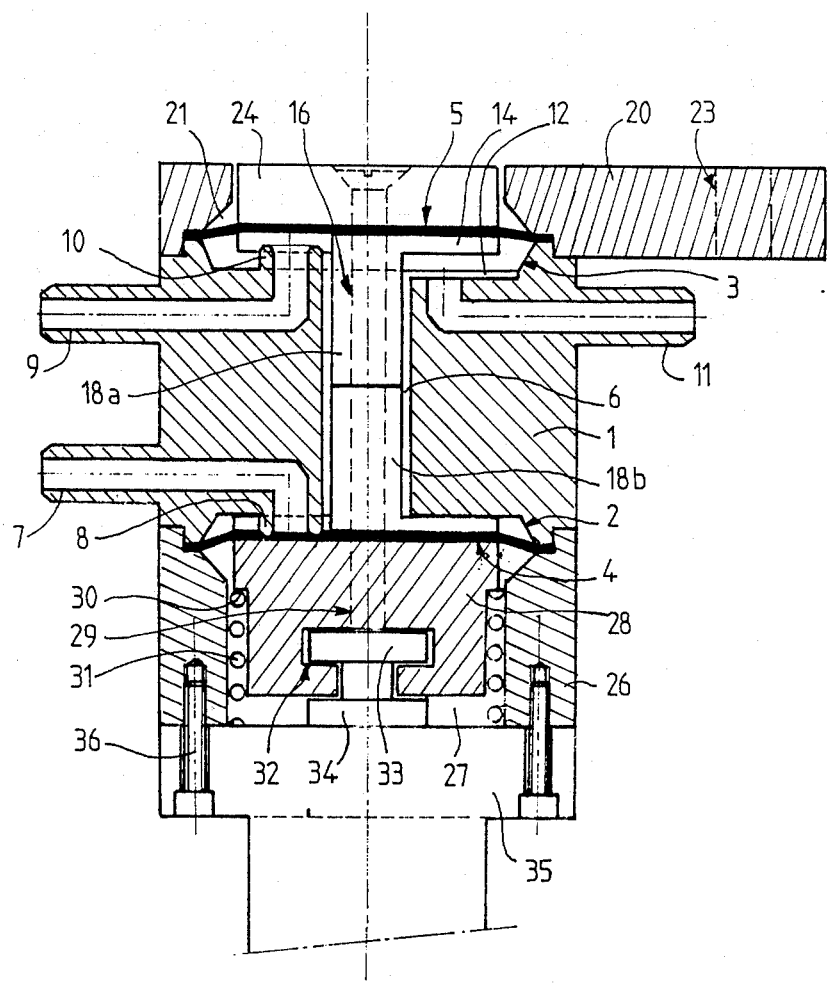
FIG. 1, a schematical sectional view of the microelectrovalve.

The valve shown in the drawings is formed essentially of a main valve body 1 forming a rectangular case whose two opposite faces are countersunk so as to form cups 2 and 3 intended respectively for housing a lower membrane 4 and an upper membrane 5, a central well 6 passes through the main body 1 coaxially with respect to cups 2 and 3. The main valve body 1 is provided on one of its sides with three pipes pierced transversally to the axis of well 6. A lower fluid outgoing pipe 7 opens into the lower cup 2 inside a ring projecting from the bottom of its cup, forming a seat 8 for the closure member formed by membrane 4 having a small central orifice. Similarly, an other upper fluid outgoing pipe 9 opens into the upper cup 3 inside a ring projecting from the bottom of this cup, forming a seat 10 for the closure member formed by another identical membrane 5. Thus, each of the flexible membranes 4, 5 seaingly closes, by a small eccentric part of its surface, the pipe 7, 9 which itself emerges into a zone of the corresponding cup, set apart from the central well 6. At the same level as the upper pipe 9, there is provided a third incoming fluid pipe 11 which also opens into cup 3 but inside a recess 12 formed in the bottom of this cup, on the side opposite seat 10 with respect to well 6, and in a zone also set apart from the central well.

The central well 6 has passing therethrough a core 18 formed of two indentical parts 18a and 18b. Each part of core 18 is formed of a cylinder 13 of a diameter slightly less than that of well 6 ending in a plate 14 of larger diameter extending at least as far as orifices 8, 10, 12 provided at the bottom of the cups. The plate has on the side an indentation 15. Core 18 finally has passing therethrough over the whole of its height an axial opening 16, ending on the same side as the end of cylindrical part 13, in a truncated cone shaped recess 17. The two parts 18a and 18b are mounted symmetrically and bearing one against the other through their respective cylindrical parts 13. The lower and upper plates 14 are then situated in cups 2 and 3. The truncated cone shaped recess 17 serves for housing a seal 19. The two membranes 4 and 5 and core 18 form the mobile assembly which, depending on the position which it occupies, closes one or other of the pipes leading to said cups. These membranes limit the inner chamber of the microvalve in which the fluid flows between the two pipes.

The main body 1 of the valve is capped with an end piece 20 of rectangular shape having a central opening 21 and profiled so as to correspond to the cup 13 of the main body 1. Holes, not shown, are provided in piece 21 for fixing it to the main body 1 having fixing orifices 22, which results in nipping the membrane 5 therebetween. Piece 20 has a larger dimension than that of the valve body 1 so that the projecting part serves for fixing the microelectrovalve, through other fixing holes 23 with which it is provided. The central hole 21 in end piece 20 serves for housing an upper plug 24 itself pierced with a central orifice of a diameter identical to that of the axial opening 16 of core 18. Said orifice is chamfered so as to receive the head of a screw 25 intended to pass through the valve body as will be described further on. On the side opposite the end piece 20 there is provided on the main valve body 1, a spacer 26 which is a rectangular piece of a certain height also having a central opening 27 and whose upper part is profiled so as to correspond to cup 2 in the main body. Fixing of this spacer 26 to body 1, through orifices 22, nips the membrane 4 therebetween. The central opening 27 in spacer 26 serves as housing for an engagement member 28 of a general cylindrical shape having in its center a threaded orifice 29 for receiving the tip of screw 25. Piece 28 has a shoulder 30 serving as stop for a spring 31. Piece 28, at its lower part has a T shaped recess 32. In this recess is engaged an engagement stud 33 integral with the mobile core 34 of an electromagnet 35 itself fixed to spacer 26 by screws 36. Spring 31 is thus inserted between the engagement member 28 and the electromagnet 35.

Figure 2:
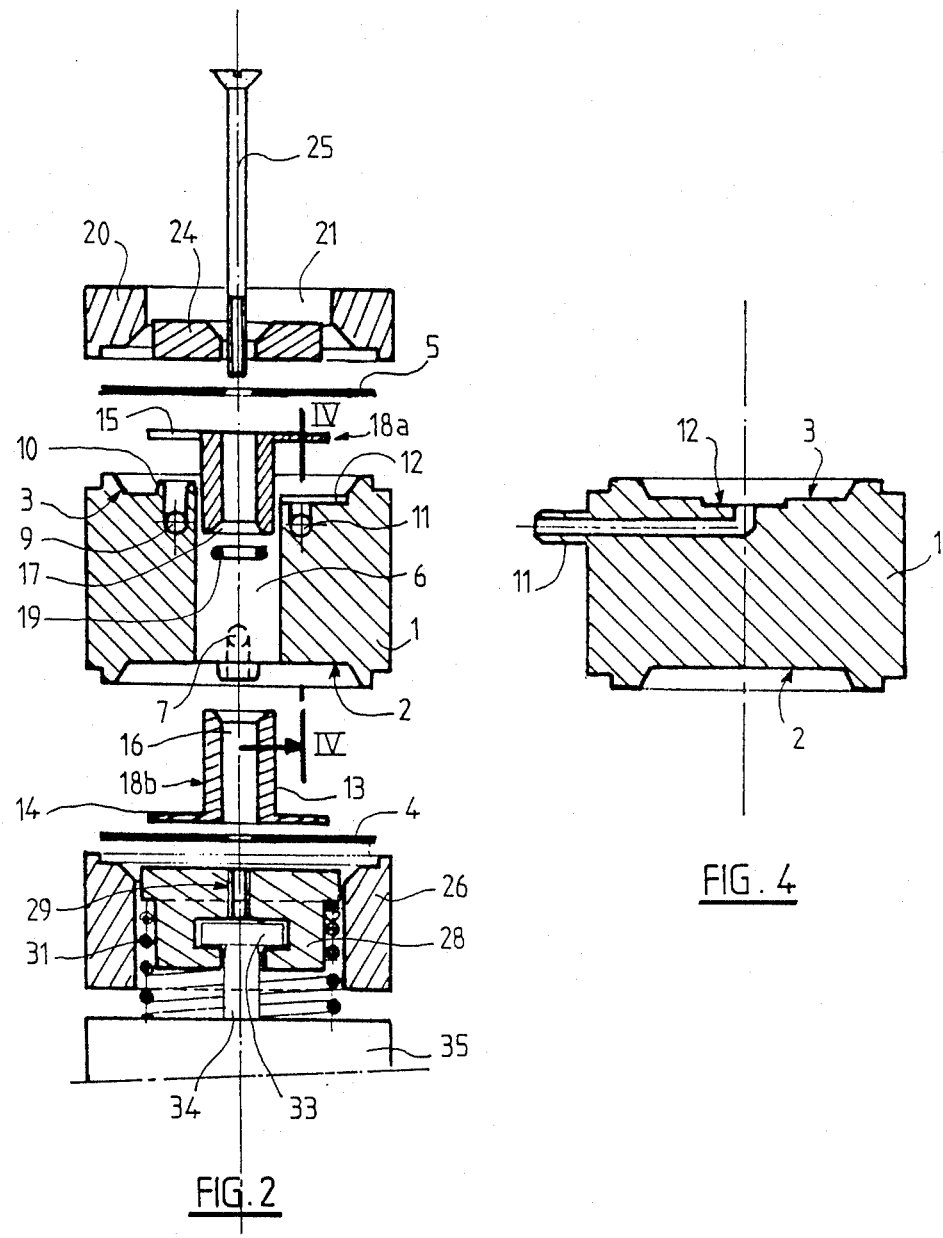
FIG. 2, an exploded view of its component elements.
Figure 3:
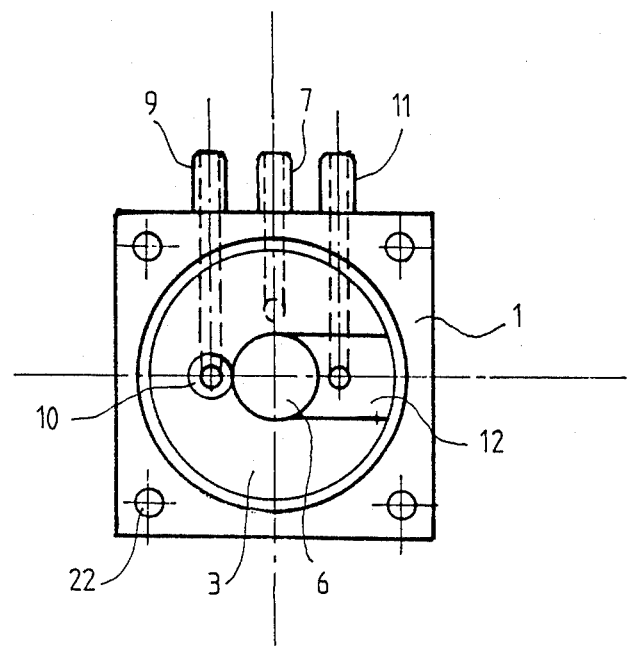
FIG. 3, a top view of the upper part of the valve body.

The microelectrovalve such as shown in FIG. 1 is mounted in the following way from the elements of FIG. 2. Into well 6 of the main body 1 are introduced the two core elements 18a and 18b, plates 14 then bearing at the bottom of cups 2 and 3 and their indentations 15 being positioned about seats 8 and 10 which form a relief at the bottom of the cups. Care is taken beforehand to place seal 19 in a truncated cone shaped recess 17, which seal will then be crushed between the two ends 13 of cores 18a, 18b. Then, by means of screw 15 which passes through plug 24, membrane 5 then the first part of core 18a, the engagement piece 28 is secured through the threaded portion 29 with the second part of core 18b, membrane 4 being inserted between the two. Tightening of screw 5 causes the membranes 4 and 5 to be nipped respectively between the engagement piece 28 and core 18 on the one hand and plug 24 and core 18 on the other. The mobile assembly thus formed is fixed to the main body 1 by means of membranes 4 and 5 which are positioned in the corresponding cups and whose edges are nipped against said body when the end piece 20 is fixed on one side and the spacer 26 on the other, using the orifices 22 which pass through body 1.

Then stud 33 of core 34 is engaged in indentation 32. After the electromagnet 35 has been fixed to the spacer, the piece shown in FIG. 1 is obtained.

The operation of the microelectrovalve is as follows:

It is assumed that fluid arrives through pipe 11. The mobile assembly (4, 5, 18) occupies the position shown, which is the rest position. In fact, since the electromagnet 35 is not energized, spring 31 bearing on the shoulder 30 of piece 28 exerts a vertical thrust from top to bottom on the mobile assembly. The lower membrane 4 is thus applied against seat 8 against which it is crushed and consequently sealingly closes pipe 7. On the other hand, membrane 5 is in a top position in which it is moved away from seat 10 freeing pipe 9. The fluid passes freely from pipe 11 to pipe 9 and occupies the central well 6 about core 18. Sealing is provided, at the level of the core with respect to the opening 16, by the small seal 19 and, at the level of openings 21 and 27 by nipping the flexible membranes about cups 3 and 2. Thus total sealing of the flowing fluid is obtained with the external environment of the valve.

As soon as the electromagnet 35 is energized, core 34 exerts a downward tractive force on the engagement member 28 through the stud 33, which causes the mobile assembly (4, 5, 18) to descend against the force of spring 31. Membrane 4 moves then away from seat 8, but the downwardly driven membrane 5 is applied against seat 10 and closes pipe 9. The fluid then passes from pipe 11 to pipe 7. This membrane 5 in the low position should nevertheless not close the inlet orifice of pipe 11 into cup 3. That explains the existence of recess 12, mentioned above, which allows fluid to pass normally between pipe 11 and the inside of the microelectrovalve, whatever the positions of the membrane.

It will be noted that the small range of movement which the mobile assembly (4, 5, 18) may take allows a low power electromagnet 35 to be used, for example from 4 to 6 watts, and also provides a valve of small size. The sealing seats 8 and 10 also of small size, when used with liquids including waste, eliminates, because of the fluid flow passing through the orifice, the waste which may be blocked in the valve. Since closure is provide by one or other of the membrane against small sized seats, and not concentric with each membrane, closure may be obtained at appreciably higher pressures than with conventional valves.

Thus constructed, the dead volume of the microelectrovalve, that is to say the available volume of well 6 about core 18, is restricted; thus cleaning of the valve may take place with only a small amount of fluid.

The fact that the supply pipe 11 opens into a cup means that the rinsing liquid may be caused to pass to pipe 7 from the other cup while rinsing the whole of the well.

It will be noted that the valve can be operated manually by pressing the end plug 24 against spring 31, since this plug is flush with the upper part of the case.

Several of these small sized valves may be mounted and fixed in a battery by means of piece 20. The fact that pipes 7, 9, 11 are situated on the same side of the case promotes location thereof.

Microelectrovalves whose elements are advantageously made from materials capable of withstanding aggressive fluids find a particular application in medical analysis equipment, but also in food and other industries.

What is claimed is:

1. In a microelectrovalve with at least two ways including a main body having two opposite faces which are countersunk to form cups, said main body defining an inner chamber into which open fluid incoming and outgoing pipes, and a mobile assembly forming a closure member moved by a mobile core of an electromagnet, the mobile aassembly being essentially formed of two flexible membranes mounted on each side of a core which passes through a central well provided in the main body of the microelectrovalve, the improvement comprising each flexible membrane sealingly closing, by a small eccentric part of its surface, the outgoing pipes which open into a zone of the corresponding cup, transverse from the central wall and the fluid incoming pipe opens into one of the cups in a zone also transverse from the central wall.

2. The microelectrovalve as claimed in claim 1, wherein said fluid inlet pipe opens into a cup inside a recess formed in the bottom of said cup.

3. The microelectrovalve as claimed in claim 1, wherein the core of the mobile assembly is formed of two identical parts each of which is formed of a cylinder ending in a plate having an indentation and through which an axial opening is formed over the whole of its height.

4. The microelectrovalve as claimed in claim 3, wherein said core has two parts in abutment one against the other by the end of a cylindrical part defining a truncated cone shaped recess which serves as a housing for a seal.

5. The microelectrovalve as claimed in claim 1, wherein the two opposite faces of the main body of the valve are capped with end pieces having central openings which are fixed to the main body and nip each of the membranes against the edges of the cups, wherein the central opening of said end pieces houses an upper plug bearing against the membrane.

6. The microelectrovalve as claimed in claim 5, wherein the end piece serves as a spacer supporting the electromagnet and wherein the central opening of the end piece houses an engagement member of the mobile core of the electromagnet.

7. The microelectrovalve as claimed in claim 6, wherein a spring is inserted between the engagement member of the mobile core and the electromagnet.

8. The microelectrovalve as claimed in claim 1, wherein the different parts forming the mobile assembly are secured together by means of a bolt which passes through an upper plug, a first membrane, the core, a second membrane and which cooperates with a threaded orifice provided in an engagement member.

* * * * *